(12) United States Patent
Ikeda et al.

(10) Patent No.: US 6,920,322 B2
(45) Date of Patent: Jul. 19, 2005

(54) PAGING CONTROL METHOD AND PAGING CONTROL SYSTEM IN COMMUNICATION SYSTEM

(75) Inventors: Takehiro Ikeda, Kanagawa (JP); Ichiro Okajima, Kanagawa (JP); Narumi Umeda, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 550 days.

(21) Appl. No.: 09/993,918

(22) Filed: Nov. 6, 2001

(65) Prior Publication Data

US 2002/0082005 A1 Jun. 27, 2002

(30) Foreign Application Priority Data

Nov. 8, 2000 (JP) ........................................ 2000-340973

(51) Int. Cl.[7] ................................................. H04Q 7/20
(52) U.S. Cl. ..................... 455/426.1; 455/458; 455/515; 455/432.1; 455/436; 455/444
(58) Field of Search .............................. 455/426.1, 458, 455/515, 551, 552.1, 553.1, 432.1, 12.1, 427, 442, 444, 436

(56) References Cited

U.S. PATENT DOCUMENTS

| | | | |
|---|---|---|---|
| 5,541,976 A | | 7/1996 | Ghisler ........................ 379/57 |
| 5,854,985 A | | 12/1998 | Sainton et al. ............... 455/553 |
| 5,870,673 A | | 2/1999 | Haartsen ...................... 455/426 |
| 5,873,042 A | * | 2/1999 | Vo ................................. 455/458 |
| 5,920,821 A | * | 7/1999 | Seazholtz et al. ............ 455/466 |
| 5,946,619 A | * | 8/1999 | Kolev ....................... 455/432.1 |
| 6,058,308 A | * | 5/2000 | Kallin et al. .............. 455/432.3 |
| 6,108,518 A | * | 8/2000 | Madour et al. ............ 340/7.25 |
| 6,148,198 A | * | 11/2000 | Anderson et al. ......... 455/432.1 |
| 6,449,494 B1 | * | 9/2002 | Cashman ................. 455/553.1 |
| 6,477,382 B1 | * | 11/2002 | Mansfield et al. .......... 455/458 |
| 6,560,461 B1 | * | 5/2003 | Fomukong et al. ....... 455/456.2 |
| 6,826,414 B1 | * | 11/2004 | Reynolds et al. ............ 455/555 |
| 2002/0019241 A1 | * | 2/2002 | Vialen et al. ................ 455/458 |
| 2003/0045289 A1 | * | 3/2003 | Zhao et al. .................. 455/435 |

FOREIGN PATENT DOCUMENTS

| | | | |
|---|---|---|---|
| EP | 0808073 A2 | 11/1997 | ............ H04Q/7/38 |
| WO | WO 94/08403 | 4/1994 | ............ H04B/7/02 |
| WO | WO 96/35289 | 11/1996 | |
| WO | WO 97/22217 | 6/1997 | ............ H04Q/7/22 |
| WO | WO00/21318 | 4/2000 | ............ H04Q/7/38 |

OTHER PUBLICATIONS

Austrian Patent Office Service and Information Sector (TRF) Search Report Application No.: 200106839–4.
ETSI TS 123 060 V3.5.0 (Oct. 2000) Digital Cellular Telecommunications System (Phase 2+) (GSM); Universal Mobile Telecommunications System (UMTS); General Packet Radio Service (GPRS); Service description; Stage 2 (3GPP TS 23.060 version 3.5.0 Release 1999) p. 1 to 182.

* cited by examiner

*Primary Examiner*—Sonny Trinh
*Assistant Examiner*—Huy Phan
(74) *Attorney, Agent, or Firm*—Workman Nydegger

(57) ABSTRACT

Efficient paging control is achieved in a communication system that selectively provides one of communication services implemented by integrating a plurality of communication systems. Before transmitting a downlink signal to a terminal, a gateway requests each of the communication systems to transmit a paging signal to the terminal. Receiving the paging signals transmitted from the communication systems, the terminal selects a communication system A with the lowest communication cost in accordance with communication cost information contained in the paging signal. The terminal sends a request for connection to the selected communication system A. As a result, the communication system A transmits the downlink signal to the terminal.

16 Claims, 6 Drawing Sheets

FIG.4A

FORMAT OF REQUEST SIGNAL S11 TRANSMITTED FROM TERMINAL TO PAGING AGENT

| DESTINATION ADDRESS FIELD | SOURCE ADDRESS FIELD | TERMINAL LOCATION FIELD | REQUEST FIELD |
|---|---|---|---|
| PAGING AGENT ADDRESS | TERMINAL ADDRESS | TERMINAL LOCATION INFORMATION | LOWEST COMMUNICATION COST |

FIG.4B

FORMAT OF SIGNAL S12 TRANSMITTED FROM GATEWAY TO PAGING AGENT

| DESTINATION ADDRESS FIELD | SOURCE ADDRESS FIELD | |
|---|---|---|
| PAGING AGENT ADDRESS | GATEWAY ADDRESS | TERMINAL ADDRESS |

FIG.4C

FORMAT OF SIGNAL S13 SENT BACK FROM PAGING AGENT TO GATEWAY

| DESTINATION ADDRESS FIELD | SOURCE ADDRESS FIELD | | |
|---|---|---|---|
| GATEWAY ADDRESS | PAGING AGENT ADDRESS | TERMINAL ADDRESS | OPTIMUM SYSTEM NAME |

FIG.6A

FORMAT OF REQUEST SIGNAL S11 TRANSMITTED FROM TERMINAL TO PAGING AGENT

| DESTINATION ADDRESS FIELD | SOURCE ADDRESS FIELD | TERMINAL LOCATION FIELD | REQUEST FIELD |
|---|---|---|---|
| PAGING AGENT ADDRESS | TERMINAL ADDRESS | TERMINAL LOCATION INFORMATION | LOWEST COMMUNICATION COST |

FIG.6B

FORMAT OF SIGNAL S12 TRANSMITTED FROM GATEWAY TO PAGING AGENT

| DESTINATION ADDRESS FIELD | SOURCE ADDRESS FIELD |
|---|---|
| PAGING AGENT ADDRESS | GATEWAY ADDRESS | TERMINAL ADDRESS |

FIG.6C

FORMAT OF SIGNAL S13 SENT BACK FROM PAGING AGENT TO GATEWAY

| DESTINATION ADDRESS FIELD | SOURCE ADDRESS FIELD | | |
|---|---|---|---|
| GATEWAY ADDRESS | PAGING AGENT ADDRESS | TERMINAL ADDRESS | OPTIMUM SYSTEM NAME |

FIG.6D

FORMAT OF PAGING SIGNAL S25

| | SYSTEM NAME FIELD |
|---|---|
| TERMINAL ADDRESS | SYSTEM A |

PAGING CONTROL METHOD AND PAGING CONTROL SYSTEM IN COMMUNICATION SYSTEM

This application claims priority under 35 U.S.C. 119 to Patent Application No. 2000-340973 filed Nov. 8, 2000 in Japan, the content of which is incorporated hereinto by reference.

BACKGROUND OF THE INVENTION

1. Field of the Invention

The present invention relates to a paging control method, a paging control system and a recording medium recording a paging control program in a communication system that provides a terminal with communication services via a radio communication channel or a wire communication channel.

2. Description of the Related Art

A terminal such as a mobile station in a mobile communication system, the battery of which is limited in its capacity, so a terminal is usually in the battery saving mode so-called idle mode that halts transfer of information to save power of the battery. When a base station transmits a downlink information signal to the terminal in the idle mode, it transmits a paging signal before transmitting an actual information signal to enable the terminal to shift from the idle mode to a receivable mode (standby mode). Such control is called paging control.

Since each conventional communication system offers closed independent services of its own, the paging control is also carried out by each communication system independently.

In contrast with this, a virtual communication system, which integrates multiple communication systems with different features and provides the terminal with a communication service selected from the multiple communication systems, is considered to be a very efficient system because it can handle various requests of the terminal flexibly.

However, efficient paging control for such a communication system that integrates multiple communication systems has not yet been conceived.

SUMMARY OF THE INVENTION

An object of the present invention is to implement efficient paging control for a communication system that can offer any one of communication services that are provided by integrating a plurality of communication systems.

To accomplish the object, according to a first aspect of the present invention, there is provided a paging control method of a communication system that selectively provides one of communication services implemented by integrating a plurality of communication systems, the paging control method comprising: a first step of transmitting a paging signal from each of the plurality of communication systems to a terminal; and a second step of receiving the plurality of paging signals by the terminal, and of selecting a desired communication system for use by the terminal from the plurality of communication systems in accordance with information contained in the plurality of paging signal received.

The paging control method may further comprise a third step of transmitting a connection request signal from the terminal to the desired communication system selected at the second step.

According to a second aspect of the present invention, there is provided a paging control method of a communication system that selectively provides one of communication services implemented by integrating a plurality of communication systems, and includes a paging agent for managing paging signals, the paging control method comprising: a first step of transmitting previously a request for a communication system a terminal wishes to use, and terminal location information of the terminal from the terminal to the paging agent, and of registering the received request and the terminal location information in the paging agent; a second step of selecting an optimum communication system from among the plurality of communication systems by the paging agent in accordance with the registered request and the terminal location information in the paging agent; and a third step of transmitting the paging signal from the optimum communication system to the terminal.

The paging control method may further comprise a fourth step of transmitting a connection request signal from the terminal to the optimum communication system.

According to a third aspect of the present invention, there is provided a paging control method of a communication system that selectively provides one of communication services implemented by integrating a plurality of communication systems, and includes a paging agent for managing paging signals, the paging control method comprising: a first step of transmitting previously a request for a communication system a terminal wishes to use, and terminal location information of the terminal from the terminal to the paging agent, and of registering the received request and the terminal location information in the paging agent; a second step of selecting an optimum communication system from among the plurality of communication systems by the paging agent in accordance with the registered request and the terminal location information in the paging agent; and a third step of transmitting a paging signal including a name of the communication system selected at the second step from a given communication system predetermined from among the plurality of communication systems to carry out transmission to the terminal.

The paging control method may further comprise a fourth step of transmitting a connection request signal from the terminal to the given communication system, and of waiting for an information signal from the optimum communication system contained in the paging signal.

The second step may use one of a communication cost, a transmission rate, a transmission quality and a combination of at least two of them as a selection index of the optimum communication system.

According to a fourth aspect of the present invention, there is provided a paging control system of a communication system that selectively provides one of communication services implemented by integrating a plurality of communication systems, the paging control system comprising: communication control means for causing each of the plurality of communication systems to transmit a paging signal via an external network; and a terminal for receiving the plurality of paging signals, and for selecting a desired communication system for use from the plurality of communication systems in accordance with information contained in the plurality of paging signal received.

The terminal may transmit a connection request signal to the desired communication system selected.

According to a fifth object of the present invention, there is provided a paging control system of a communication system that selectively provides one of communication services implemented by integrating a plurality of communication systems, and includes a paging agent for managing paging signals, the paging control system comprising: a terminal for transmitting previously a request for a communication system a terminal wishes to use, and terminal location information of the terminal from the terminal to the paging agent; registering means in the paging agent for registering the received request and the terminal location information; selecting means in the paging agent for selecting an optimum communication system from among the plurality of communication systems in accordance with the registered request and the terminal location information in the registering means; and communication control means for causing the optimum communication system selected by the selecting means to transmit the paging signal to the terminal.

The terminal may transmit a connection request signal to the optimum communication system.

According to a sixth aspect of the present invention, there is provided a paging control system of a communication system that selectively provides one of communication services implemented by integrating a plurality of communication systems, and includes a paging agent for managing paging signals, the paging control system comprising: a terminal for transmitting previously a request for a communication system a terminal wishes to use, and terminal location information of the terminal to the paging agent; storing means in the paging agent for registering the received request and the terminal location information; selecting means in the paging agent for selecting an optimum communication system from among the plurality of communication systems in accordance with the registered request and the terminal location information in the storing means; and communication control means for transmitting a paging signal including a name of the optimum communication system selected by the selecting means from a given communication system predetermined from among the plurality of communication systems to the terminal.

The terminal may transmit a connection request signal to the given communication system, and wait for an information signal from the optimum communication system contained in the paging signal.

The selecting means may use one of a communication cost, a transmission rate, a transmission quality and a combination of at least two of them as a selection index of the optimum communication system.

The selecting means may carry out the selection of the optimum communication system in response to a query about the optimum communication system from the communication control means.

According to a seventh aspect of the present invention, there is provided a recording medium recording a paging control program in a communication system that selectively provides one of communication services implemented by integrating a plurality of communication systems, and includes a paging agent for managing paging signals, the paging control program, which is used by a computer for controlling the paging agent, causing the computer to: receive from a terminal a request for a communication system the terminal wishes to use, and terminal location information of the terminal; to register the received request and the terminal location information; to select an optimum communication system from among the plurality of communication systems in accordance with the registered request and the terminal location information; and to cause the optimum communication system selected to transmit the paging signal to the terminal.

According to an eighth aspect of the present invention, there is provided a recording medium recording a paging control program in a communication system that selectively provides one of communication services implemented by integrating a plurality of communication systems, and includes a paging agent for managing paging signals, the paging control program, which is used by a computer for controlling the paging agent, causing the computer to: receive from a terminal a request for a communication system the terminal wishes to use, and terminal location information of the terminal; register the received request and the terminal location information; select an optimum communication system from among the plurality of communication systems in accordance with the registered request and the terminal location information; and cause a given communication system, which is predetermined in advance from among the plurality of communication systems communication control means for carrying out transmission to the terminal, to transmit to the terminal a paging signal including a name of the optimum communication system selected.

With the foregoing configurations, the present invention can implement efficient paging control in the communication system that can offer any one of communication services that are provided by integrating the plurality of communication systems.

The above and other objects, effects, features and advantages of the present invention will become more apparent from the following description of embodiments thereof taken in conjunction with the accompanying drawings.

BRIEF DESCRIPTION OF THE DRAWINGS

FIG. 4A is a signal format diagram illustrating an example of a signal format of a request signal S11 of FIG. 3;

FIG. 4B is a signal format diagram illustrating an example of a signal format of a query signal S12 of an optimum system of FIG. 3;

FIG. 4C is a signal format diagram illustrating an example of a signal format of a reply signal S13 of FIG. 3;

FIG. 6A is a signal format diagram illustrating an example of a signal format of a request signal S11 of FIG. 5;

FIG. 6B is a signal format diagram illustrating an example of a signal format of a query signal S12 of an optimum system of FIG. 5;

FIG. 6C is a signal format diagram illustrating an example of a signal format of a reply signal S13 of FIG. 5; and FIG. 6D is a signal format diagram illustrating an example of a signal format of a paging signal of FIG. 5.

DETAILED DESCRIPTION OF PREFERRED EMBODIMENTS

The configurations and operations of some communication systems according to the embodiments of the present invention will be described below with reference to the drawings.

(First Embodiment)

Figure 1:
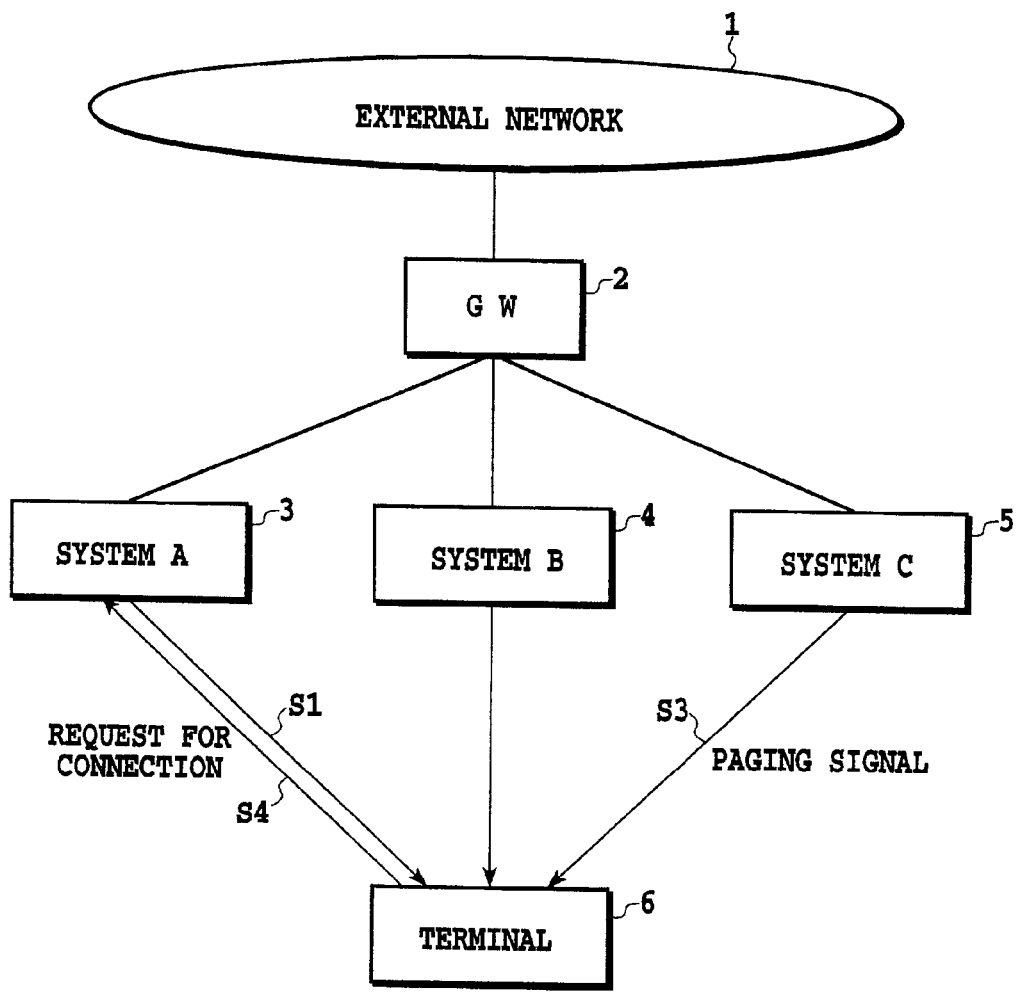
FIG. 1 is a block diagram showing a configuration of a first embodiment of the communication system in accordance with the present invention.

FIG. 1 is a block diagram showing a configuration of a first embodiment of the communication system in accordance with the present invention. In this figure, the reference numeral 1 designates an external network; 2 designates a gateway (GW); 3, 4 and 5 designate a communication system A, a communication system B and a communication system C, respectively; and 6 designates a terminal. It is assumed in the present embodiment that the signal from the external network 1 is transmitted to the individual communication systems 3–5 via the gateway 2. Although the communication systems 3–5 are different communication systems, they can be a wired or wireless system, and are integrated via the gateway 2.

Figure 2:
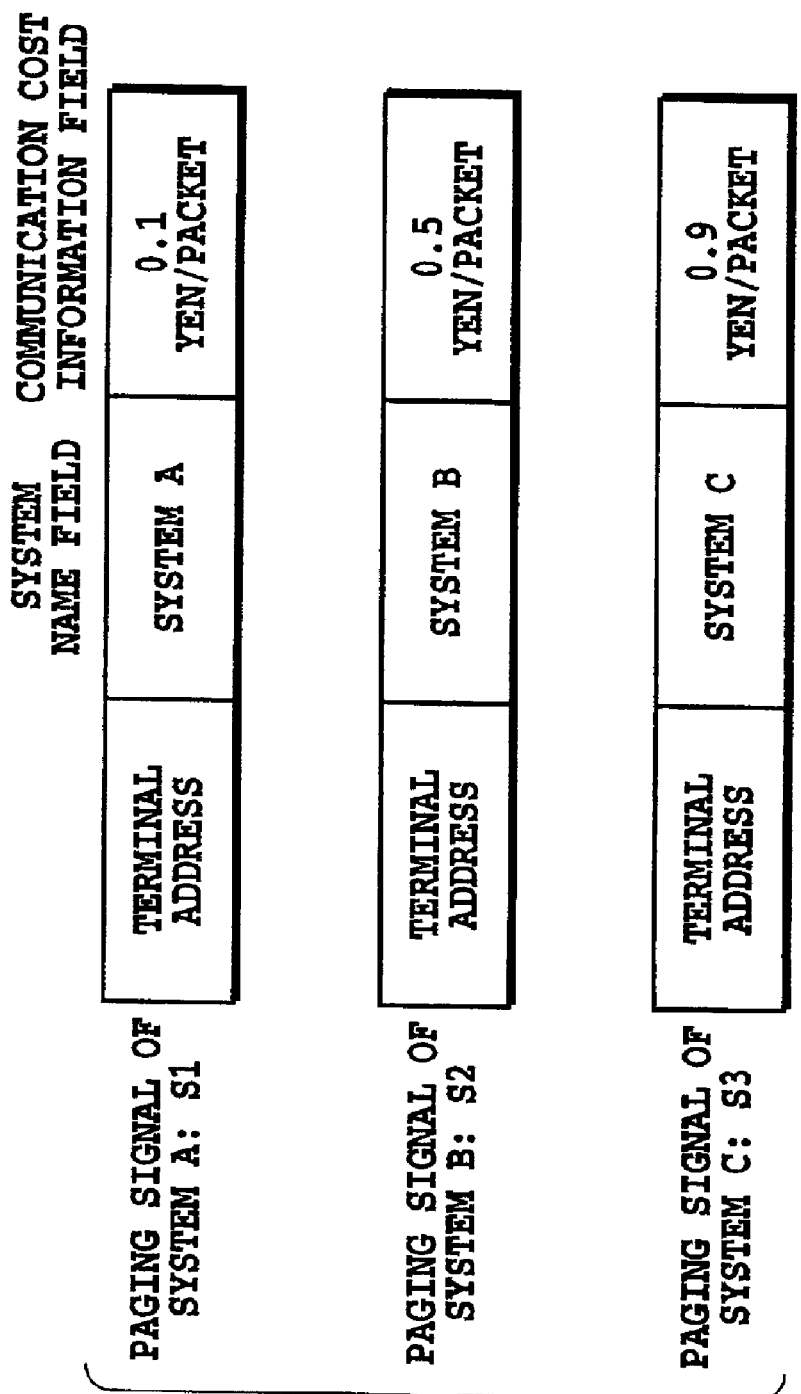
FIG. 2 is a signal format diagram illustrating an example of a paging signal transmitted from individual communication systems 3–5 of FIG. 1.

FIG. 2 is a signal format diagram illustrating an example of a paging signal transmitted from each of the communication systems 3–5 of FIG. 1. Reference symbols S1, S2 and S3 designate paging signals of the communication systems A, B and C respectively. They each include their own terminal address, system name field and communication cost information field. In the example of FIG. 2, the communication cost of the communication systems satisfies the relationship of S1<S2<S3. Accordingly, it is obvious that the communication cost of the communication system A is cheapest.

In the first embodiment in accordance with the present invention, when there is a downlink signal from an external network to a terminal (the terminal 6, for example) among a plurality of terminals, the gateway 2 requests the communication systems 3–5 to transmit the paging signals S1–S3 to the terminal. Receiving the paging signals transmitted from the communication systems 3–5, the terminal 6 selects a communication system with the lowest communication cost (in the present example, the communication system A 3) in accordance with the communication cost information contained in the paging signals S1–S3.

Subsequently, the terminal 6 sends a request for connection to the selected communication system. Here, the terminal 6 selects the communication system A. As a result, the downlink signal is transmitted to the terminal 6 via the communication system A.

Although the communication cost of the present embodiment is based on a measured rate charge system, it can be based on a connect time charge system. In addition, although the present embodiment uses the communication cost as the selection index of the communication system, other selection indices are also applicable. For example, it is possible to use a transmission rate, a transmission quality or a combination of the communication cost and the transmission rate or the like as the selection index for selecting the communication system. In this case, these pieces of information used as the communication system selection index must be contained in the paging signals transmitted from the individual communication systems.

(Second Embodiment)

Figure 3:
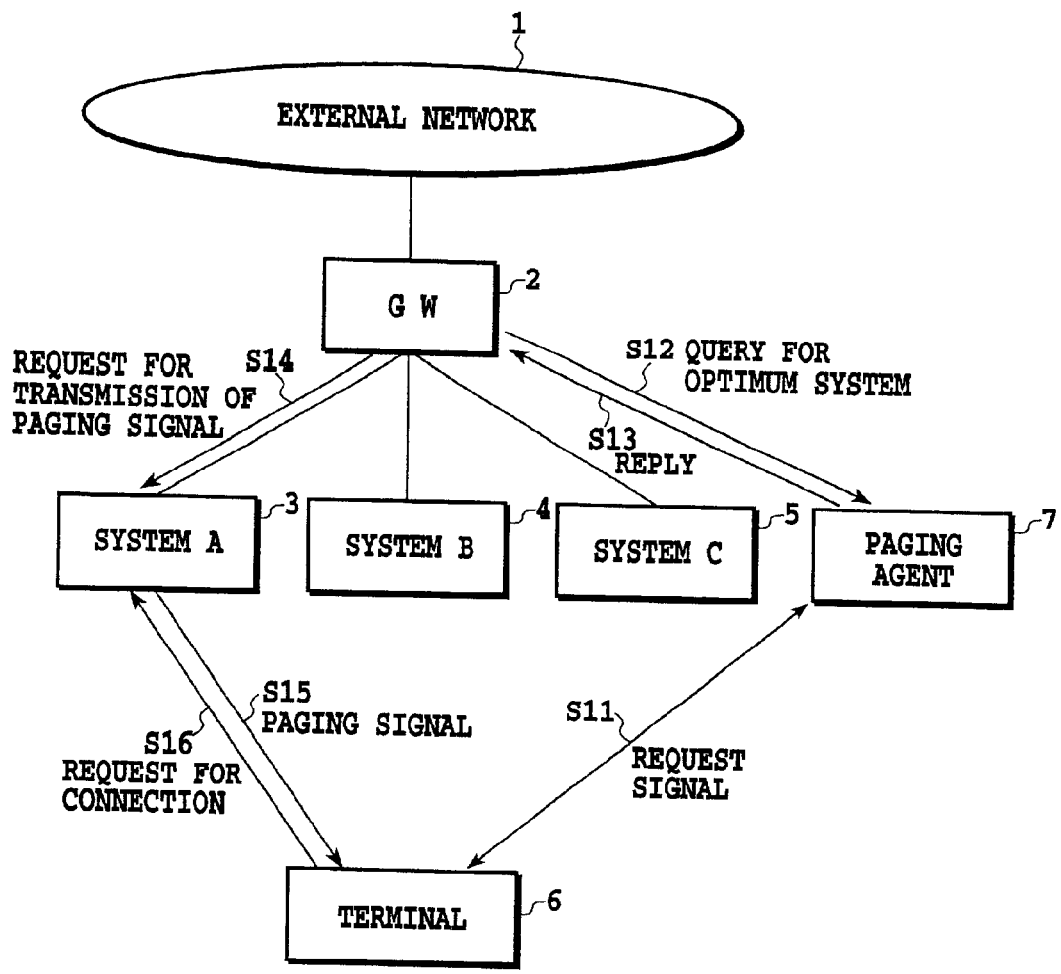
FIG. 3 is a block diagram showing a configuration of a second embodiment of the communication system in accordance with the present invention.

FIG. 3 is a block diagram showing a configuration of a second embodiment of the communication system in accordance with the present invention. In this figure, the reference numeral 7 designates a paging agent connected between the gateway 2 and the terminal 6. The paging agent 7 can recognize communication systems available for the use of each terminal 6 from the terminal location information of the terminal 6, and obtain information such as communication cost and transmission rate about the individual communication system at the terminal location. Since the remaining components are the same as those of the first embodiment described above in connection with FIG. 1, the description thereof is omitted here.

FIG. 4A illustrates an example of a signal format of a request signal S11 a terminal 6 among a plurality of terminals transmits to the paging agent 7. The request signal S11 includes a destination address field (paging agent address), a source address field (terminal address), a terminal location field (terminal terminal location information) and a request field (such as the lowest communication cost).

The terminal 6 previously sends the information about the request (such as the lowest communication cost) for the communication system to be connected to the paging agent 7, by using the signal format of FIG. 4A.

According to the terminal location information and the request from the terminal, the paging agent 7 selects the optimum communication system (communication system A 3, for example), and stores it in its internal memory (not shown in this figure).

Subsequently, before transmitting a downlink signal to the terminal 6, the gateway 2 inquires of the paging agent 7 which one of the communication systems the terminal 6 wishes to be connected with, by using a query signal S12 with the signal format of FIG. 4B. The query signal S12 includes a destination address field (paging agent address), a source address (gateway address) and a terminal address.

The paging agent 7 replies the gateway 2 by the reply signal S13 with the signal format of FIG. 4C. The reply signal S13 includes a destination address field (gateway address), a source address field (paging agent address), a terminal address and an optimum communication system name (communication system A 3, for example).

The gateway 2 request the communication system (optimum communication system) associated with the reply to transmit the paging signal to the terminal by using a request for transmission of paging signal S14. Here, the communication system A 3 is assumed to be selected as the optimum communication system.

Receiving the paging signal transmitted from the communication system A, the terminal 6 sends a request for connection back to the communication system A. As a result, the downlink signal is transmitted to the terminal 6 via the communication system A.

Although the present embodiment uses the communication cost as the selection index of the communication system just as the foregoing first embodiment, this is not essential. For example, it can use other selection index such as a transmission rate, a transmission quality or a combination of the communication cost and the transmission rate as the selection index to select the communication system. In this case, the terminal 6 must specify its own request (transmission rate, for example) in the request field of the request signal S11 of FIG. 4A to be transmitted to the paging agent 7.

(Third Embodiment)

Figure 5:
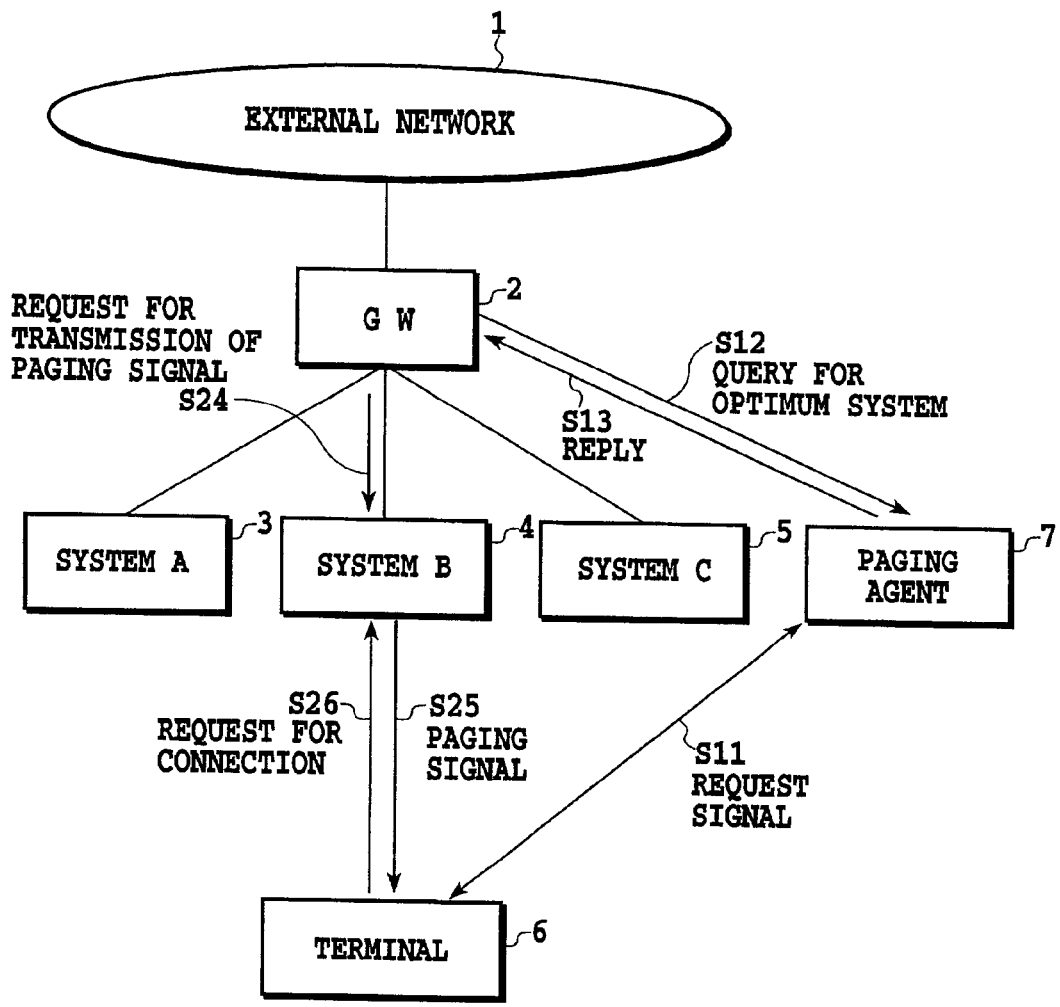
FIG. 5 is a block diagram showing a configuration of a third embodiment of the communication system in accordance with the present invention.

FIG. 5 is a block diagram showing a configuration of a third embodiment of the communication system in accordance with the present invention. The present embodiment is a variation of the foregoing second embodiment. Since the components of FIG. 5 are nearly the same as those of FIG. 3, the description thereof is omitted here.

The third embodiment differs from the second embodiment in that one of the communication systems is specified in advance as a system (called paging system) for transmitting a paging signal S25 to the terminal 6 as shown in FIG. 5 (in this case the communication system B 4). The paging system sends to the terminal 6 the optimum communication system name selected by the paging agent 7, that is, the communication system name (communication system A 3, for example) to be used for actually transmitting the information signal, with containing in the paging signal S25. The remaining operation is nearly the same as that of the second embodiment.

FIG. 6A illustrates a format of a request signal S11 the terminal 6 transmits to the paging agent 7; FIG. 6B illustrates a format of a signal S12 the gateway 2 transmits to the paging agent 7; and FIG. 6C illustrates a format of a signal S13 the paging agent 7 sends back to the gateway. These formats are the same as those of the second embodiment as shown in FIGS. 4A–4C.

The operation of the present embodiment will now be described.

The terminal 6 notifies the paging agent 7 of the request (such as the lowest communication cost) for the communication system to be connected with, by using the signal format of FIG. 6A in advance.

The paging agent 7 selects the optimum communication system (communication system A 3, for example) in accordance with the terminal location information and request of the terminal 6, and stores it in the internal memory (not shown in the drawings).

Subsequently, before transmitting the downlink signal to the terminal 6, the gateway 2 inquires of the paging agent 7 which one of the communication systems the terminal 6 wishes to be connected with, by using the query signal S12 with the signal format of FIG. 6B.

The paging agent 7 replies the gateway 2 using the reply signal S13 with the signal format of FIG. 6C.

Receiving the reply signal S13, the gateway 2 requests the predetermined paging system (communication system B 4 in the present embodiment) to transmit the paging signal S25 to the terminal 6. Here, the paging signal S25 includes the name of the communication system, that is, the optimum communication system selected by the paging agent 7, which is used for the actual transmission of the information signal.

FIG. 6D illustrates a format of the paging signal S25. It includes a terminal address and a system name field (that designates the communication system A 3, for example). As a criterion for determining the paging system, among the communication systems, the minimum intermittent receiving ratio or the lowest communication cost will be applicable.

Receiving the paging signal S25 transmitted from the paging system 4, the terminal 6 sends a request for connection to the paging system B 4 using the connection request signal S26, and waits for the information signal from the communication system (communication system A 3, for example) specified by the paging signal S25. Thus, the downlink signal is transmitted to the terminal 6 via the communication system A.

Although the present embodiment uses the communication cost as the selection index of the communication system just as the foregoing second embodiment, this is not essential. For example, it can use other selection index such as a transmission rate, a transmission quality or a combination of the communication cost and the transmission rate as the selection index to select the communication system. In this case, the terminal 6 must specify its own request (transmission rate, for example) in the request field of the request signal S11 of FIG. 6A to be transmitted to the paging agent 7.

It will be obvious to those skilled in the art of the present invention that the object of the present invention can be accomplished by providing a system or apparatus with a recording medium (storing medium) that records a program code of software for implementing the functions of the foregoing embodiments, and by reading and executing the program code stored in the recording medium by a computer (or CPU or MPU) of the system or apparatus. In this case, the program code itself read from the recording medium can implement the functions of the foregoing embodiments, and hence the recording medium recording the program code constitutes the present invention. As the recording medium for recording the program code and variable data such as tables, such media as a floppy disk, hard disk, optical disk, magneto-optical disk, and nonvolatile memory card are available.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A paging control method of a communication system that selectively provides to a terminal one of a plurality of communication services implemented by integrating a plurality of communication systems using an intermediary gateway, the paging control method comprising:
   a first step of the gateway requesting that each of the plurality of communication systems transmit a paging signal to the terminal when the gateway is to transmit a downlink signal to the terminal;
   a second step of each of said plurality of communication systems transmitting the paging signal to the terminal as requested in the first step; and
   a third step of said terminal receiving the plurality of paging signals, and of selecting a desired communication system for use in receiving the downlink signal, said desired communication system being selected from said plurality of communication systems in accordance with information contained in the plurality of received paging signals.

2. The paging control method as claimed in claim 1, further comprising a fourth step of transmitting a connection request signal from said terminal to said desired communication system selected at the third step.

3. A paging control method of a communication system that selectively provides to a terminal one of a plurality of communication services implemented by integrating a plurality of communication systems using an intermediary gateway, and that includes a paging agent for managing paging signals, the paging control method comprising:
   a first step of the terminal previously transmitting a selection criteria for a communication system the terminal wishes to use to receive downlink signals, and of transmitting terminal location information, to the paging agent;
   a second step the paging agent, registering, the received selection criteria and the terminal location information, characterized in that the selection criteria includes one or more of a communication cost, a transmission rate, and a transmission quantity; and
   a third step of said paging agent selecting a communication system from among the plurality of communication systems in accordance with the registered selection criteria and the registered terminal location information, the selected communication system to be used to transmit a downlink signal to the terminal.

4. The paging control method as claimed in claim 3, further comprising a fourth step of transmitting the paging signal from said selected communication system to said terminal.

5. The paging control method as claimed in claim 4, further comprising a fourth step of transmitting a connection request signal from said terminal to said selected communication system.

6. The paging control method of as claimed in claim 3, further comprising:
- a fourth step of a predetermined communication system transmitting a paging signal including a name of said communication system selected at the third step to carry out transmission of the downlink signal to said terminal, the predetermined communication system being different than the communication system selected to carry out transmission of the downlink signal to said terminal.

7. The paging control method as claimed in claim 6, further comprising a fifth step of transmitting a connection request signal from said terminal to said predetermined communication system, and waiting for the downlink signal from said selected communication system identified in said paging signal.

8. A paging control system of a communication system that selectively provides to a terminal one of a plurality of communication services implemented by integrating a plurality of communication systems using an intermediary gateway, the paging control system comprising:
- communication control means for requesting that each of the plurality of communication systems transmit a paging signal to the terminal when the gateway is to transmit a downlink signal to the terminal; and
- a terminal for receiving the plurality of paging signals transmitted by said plurality of communication systems, and for selecting a desired communication system for use in receiving the downlink signal, said desired communication system being selected from said plurality of communication systems in accordance with information contained in the plurality of received paging signals.

9. The paging control system as claimed in claim 8, wherein said terminal is adapted to transmit a connection request signal to said desired communication system.

10. A paging control system of a communication system that selectively provides to a terminal one of a plurality of communication services implemented by integrating a plurality of communication systems using an intermediary gateway, and that includes a paging agent for managing paging signals, the paging control system comprising:
- a terminal for previously transmitting a selection criteria for a communication system the terminal wishes to use to receive downlink signals, and for transmitting terminal location information to the paging agent, characterized in that the selection criteria includes one or more of a communication cost, a transmission rate, and a transmission quality;
- registering means for registering the received selection criteria and the terminal location information in said paging agent; and
- selecting means in said paging agent for selecting a communication system from among said plurality of communication systems in accordance with the registered selection criteria and the registered terminal location information, the selected communication system to be used to transmit a downlink signal to the terminal.

11. The paging control system as claimed in claim 10, further comprising communication control means for causing said selected communication system selected by said selecting means to transmit the paging signal to said terminal.

12. The paging control system as claimed in claim 11 wherein said terminal is adapted to transmit a connection request signal to said selected communication system.

13. The paging control system as claimed in claim 10, further comprising:
- communication control means for a predetermined communication system to transmit a paging signal including a name of said selected communication system selected by said selecting means, the predetermined communication system being different than the selected communication system.

14. The paging control system as claimed in claim 13, wherein said terminal is adapted to transmit a connection request signal to said predetermined communication system, and waits for the download signal from said selected communication system identified in said paging signal.

15. The paging control system as claimed in claim 10 wherein said selecting means is adapted to carry out the selection of said selected communication system in response to a query from said communication control means about what communication system is to be used to transmit the downlink signal to the terminal.

16. A recording medium containing a program code, said program code comprising program code means adapted to perform all the steps of the method of any of claims 1 to 7.

* * * * *

UNITED STATES PATENT AND TRADEMARK OFFICE
CERTIFICATE OF CORRECTION

PATENT NO. : 6,920,322 B2
DATED : July 19, 2005
INVENTOR(S) : Takehiro Ikeda et al.

It is certified that error appears in the above-identified patent and that said Letters Patent is hereby corrected as shown below:

Column 1,
Line 60, change "signal" to -- signals --.

Column 6,
Line 2, after "6" insert -- , --.
Line 3, before "transmits" insert -- , --.
Line 24, before "the gateway" insert -- to --.
Line 30, change "request" to -- requests --.
Line 44, change "other" to -- another --.

Column 7,
Line 1, change "with containing in" to -- containing --.

Signed and Sealed this

Eighth Day of November, 2005

JON W. DUDAS
*Director of the United States Patent and Trademark Office*